United States Patent
Eschbach et al.

(10) Patent No.: US 7,200,615 B2
(45) Date of Patent: Apr. 3, 2007

(54) VIEWING TABULAR DATA ON SMALL HANDHELD DISPLAYS AND MOBILE PHONES

(75) Inventors: Reiner Eschbach, Webster, NY (US); Emil V. Rainero, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 491 days.

(21) Appl. No.: 10/687,417

(22) Filed: Oct. 16, 2003

(65) Prior Publication Data

US 2005/0086259 A1 Apr. 21, 2005

(51) Int. Cl.
*G06F 17/30* (2006.01)
*G06F 3/14* (2006.01)

(52) U.S. Cl. ............... 707/104.1; 707/10; 709/203; 715/781

(58) Field of Classification Search ............ 707/10, 707/104.1, 102; 709/203, 201; 345/599, 345/2.3; 715/500, 526, 737, 740, 747, 754, 715/762, 779, 784, 786, 803, 804, 781, 830
See application file for complete search history.

(56) References Cited

U.S. PATENT DOCUMENTS

| | | | | |
|---|---|---|---|---|
| 6,035,324 | A * | 3/2000 | Chang et al. ............. | 709/203 |
| 6,314,452 | B1 | 11/2001 | Dekel et al. | |
| 6,449,639 | B1 * | 9/2002 | Blumberg ................ | 709/217 |
| 6,501,472 | B1 * | 12/2002 | Hunt et al. ............... | 345/428 |
| 6,539,547 | B2 | 3/2003 | Driscoll et al. | |
| 6,708,309 | B1 | 3/2004 | Blumberg | |
| 6,792,607 | B1 * | 9/2004 | Burd et al. ............... | 719/316 |
| 6,961,750 | B1 * | 11/2005 | Burd et al. ............... | 709/203 |
| 2004/0030741 | A1 * | 2/2004 | Wolton et al. ............ | 709/202 |

FOREIGN PATENT DOCUMENTS

| WO | WO 00 24188 | 4/2000 |
|---|---|---|
| WO | WO 00 72517 | 11/2000 |

OTHER PUBLICATIONS

Desphande S et al: "HTTP streaming of JPEG2000 images" Proceedings International Conference on Information Technology: Coding and Computing, XX, XX, Apr. 2, 2001, pp. 15-19. XP002193324 Chapter 2, 4.

Pulsifer, Alan, "JPEG 2000 Has Arrived", Advanced Imaging, May 2001.

* cited by examiner

*Primary Examiner*—Cheryl Lewis

(57) ABSTRACT

What is disclosed is a method for presenting spreadsheets and other documents on client-side devices with limited resources and tiny display screen area. The present invention involves the user, on a client-side device, scrolling through a condensed image view of a document with the user's viewpoint of the image repeatedly computed server-side. A split-bar is stitched into a composite view of the user's current viewpoint. The user clicks a scroll-bar or scroll-points to indicate an intended change in direction of their current viewpoint. The client-side device provides the server with information as to where and how the next viewpoint is to be updated. Responsive to the received client information the server updates the viewpoint currently displayed with the transmission of images therefor and provides the same back to the client. In such a manner, the computing power and resources of the server are utilized for the image manipulation, cropping, etc. rather than that of the client's handheld device.

15 Claims, 2 Drawing Sheets

| DS 9030 | 0.3 | CN | CN | 52 | 2.8 | 35 | 19-SEP |
|---|---|---|---|---|---|---|---|
| X-905 | 0.5 | CN | CN | 52 | 2.5 | 35 | 18-SEP |
| DS 9071 | 0.7 | CN | CN | 56 | 2.8 | 39 | 19-SEP |
| DS 9090 RR | 1.1 | RR | RR | *65 | 1.8 | 37 | 19-SEP |
| DS 9121 | 1.2 | CN | CN | 52 | 2.3 | 40 | 21-SEP |
| DS 9140 | 1.4 | CN | CN | 58 | 1.8 | 36 | 14-SEP |
| DS 9143 RR | 1.4 | RR | RR | 55 | 2.3 | 42 | 14-SEP |
| X-914 RR | 1.4 | RR | RR | 61 | 2.0 | 36 | 19-SEP |
| X-915 | 1.5 | CN | CN | 60 | 2.0 | 36 | 18-SEP |

| | | |
|---|---|---|
| DS 9030 | 0.3 | CN |
| X-905 | 0.5 | CN |
| DS 9071 | 0.7 | CN |
| DS 9090 RR | 1.1 | RR |
| DS 9121 | 1.2 | CN |
| DS 9140 | 1.4 | CN |
| DS 9143 RR | 1.4 | RR |
| X-914 RR | 1.4 | RR |
| X-915 | 1.5 | CN |

*FIG. 1a*

| | | | | |
|---|---|---|---|---|
| CN | 52 | 2.8 | 35 | 19-SEP |
| CN | 52 | 2.5 | 35 | 18-SEP |
| CN | 56 | 2.8 | 39 | 19-SEP |
| RR | *65 | 1.8 | 37 | 19-SEP |
| CN | 52 | 2.3 | 40 | 21-SEP |
| CN | 58 | 1.8 | 36 | 14-SEP |
| RR | 55 | 2.3 | 42 | 14-SEP |
| RR | 61 | 2.0 | 36 | 19-SEP |
| CN | 60 | 2.0 | 36 | 18-SEP |

*FIG. 1b*

| | | |
|---|---|---|
| DS 9030 | 0.3 | CN |
| X-905 | 0.5 | CN |
| DS 9071 | 0.7 | CN |
| DS 9090 RR | 1.1 | RR |
| DS 9121 | 1.2 | CN |
| DS 9140 | 1.4 | CN |
| DS 9143 RR | 1.4 | RR |
| X-914 RR | 1.4 | RR |
| X-915 | 1.5 | CN |

FIG. 2a

| | | | |
|---|---|---|---|
| DS 9030 | 8 | 35 | 19-SEP |
| X-905 | 5 | 35 | 18-SEP |
| DS 9071 | 8 | 39 | 19-SEP |
| DS 9090 RR | 8 | 37 | 19-SEP |
| DS 9121 | 3 | 40 | 21-SEP |
| DS 9140 | 8 | 36 | 14-SEP |
| DS 9143 RR | 3 | 42 | 14-SEP |
| X-914 RR | 0 | 36 | 19-SEP |
| X-915 | 0 | 36 | 18-SEP |

FIG. 2b

VIEWING TABULAR DATA ON SMALL HANDHELD DISPLAYS AND MOBILE PHONES

FIELD OF THE INVENTION

The present invention generally relates to methods for viewing documents and, more particular, to methods for rendering a portion of the document currently displayed on the user's client device wherein the manipulation of the user's viewpoint thereof is accomplished using the resources of the server and not the client-side device with the server repeatedly receiving viewpoint updates from the client and transmitting an updated image thereof back to the client.

BACKGROUND OF THE INVENTION

A relatively large amount of information takes the form of spreadsheet data, for example, tables, listings, etc. When displayed on a small handheld device such as a cellular telephone display, spreadsheets tend to be difficult to use because spatial structure and readability cannot be achieved simultaneously especially on small display devices. For the spatial structure to be visible, a large part of the spreadsheet should be made visible/readable to the end-user. Given the relatively small screen resolutions of mobile devices, text is simply not readable. For instance, in small handheld device image viewing scenario, due to the small size of the display screen of the handheld device, either a small section of the document displayed thereon is seen in readable form or the overall structure of the document is shown absent legibility. As such, a user needs a way to move around the various rows and columns of spreadsheets, tables, etc., where both spatial layout and text are important for display purposes.

This can be seen from FIGS. 1a and 1b. Suppose, for instance, one is trying to find date corresponding to the "DS 9140" label. In FIG. 1a, we see that the data shown is only "DS 9140" and the needed date "14-September" is not visible. To get to the desired information, one has to compare multiple views or remember row and/or column numbers as one moves their focus around the document. This way of navigating spreadsheets can be error prone and time consuming. Since memory is often limited in smaller devices, only sections or small portions of an entire spreadsheet can be held in memory at any one time. A split screen view with local split-bars can be implemented to enable the user to manipulate their viewpoint. This may be considered equivalent to selecting split view in an Excel-type spreadsheet and using scroll bars to navigate individual splits. However, one disadvantage with this approach is the need for software to reside on the hand-held device. This is often a problem due to small available storage, memory, and other limitations inherent on smaller devices with relatively tiny display screen area.

What is needed in this art is an image processing method that simulates split and scroll bars based on an image file format communicated between server and client.

BRIEF SUMMARY

What is disclosed is a method for presenting spreadsheets and other documents on client-side devices with limited resources and tiny display screen area. The present invention involves the user, on a client-side device, scrolling through a condensed image view of a document with the user's viewpoint of the image repeatedly computed server-side. A split-bar is stitched into a composite view of the user's current viewpoint. The user clicks a scroll-bar or scroll-points to indicate an intended change in direction of their current viewpoint. The client-side device provides the server with information as to where and how the next viewpoint is to be updated. Responsive to the received client information the server updates the viewpoint currently displayed with the transmission of images therefor and provides the same back to the client. In such a manner, the computing power and resources of the server are utilized for the image manipulation, cropping, etc. rather than that of the client's handheld device.

BRIEF DESCRIPTION OF THE DRAWINGS

FIG. 1a illustrates a first view of a spreadsheet displayed on a device with a small display wherein the field labels are shown.

FIG. 1b illustrates a second view of the same spreadsheet of FIG. 1a displayed on the same device wherein the user has moved their focus to other data fields.

FIG. 2a shows a vertical image line indicating the simulated split line along which subsequent image data will be folded.

FIG. 2b, after clicking on the right side of the image, a new view is created at the server wherein the left of the image is maintained and a shifted right side image is appended such that the desired field "14-September" is in view.

DESCRIPTION OF THE SPECIFICATION

What is disclosed is a method for presenting spreadsheets and other documents on client-side devices with limited resources and tiny display screen area. The present invention involves the user, on a client-side device, scrolling through a condensed image view of a document with the user's viewpoint of the image repeatedly computed server-side. A split-bar is stitched into a composite view of the user's current viewpoint. The user clicks a scroll-bar or scroll-points to indicate an intended change in direction of their current viewpoint. The client-side device provides the server with information as to where and how the next viewpoint is to be updated. Responsive to the received client information the server updates the viewpoint currently displayed with the transmission of images therefor and provides the same back to the client. In such a manner, the computing power and resources of the server are utilized for the image manipulation, cropping, etc. rather than that of the client's handheld device. The advantage of which can easily be understood when regarding the document sizes associated with common documents.

The present invention utilizes a web-type browser interface to facilitate the display of a document image. An indicator for vertical or horizontal split-screen viewing with additional capabilities such as zoom, level, color, etc. are also preferably provided. A split is indicated by embedding a line into the image provided to the client by the server. This is preferably done by the creation of three separate images, one of a left part, one of the center line, and one of a right part. Alternatively, a line might also be generated by drawing into the corresponding part of the image by other suitable image editing and/or image manipulation means. The server stitches the collected pieces into a single image. FIG. 2a shows the new view with the vertical line indicating the split. The current viewpoint of the user with respect to the image is calculated and the image updated accordingly such that only parts that can be viewed are transmitted to the client-side device (with some overlap around the periphery of the image). Then, a single image is transmitted to the client. The client-side device receiving the updated image from the server. The client-side device then displaying the image on the user's display screen preferably with the current viewpoint approximately central to the display area. This is achieved on the client-side device by graphic capabilities available thereon. In addition, the server can also transmit or otherwise provide to the client-side device one or more tools or other capabilities to facilitate the communication therebetween and/or the image presentation and viewpoint movement. Clicking on the right side of the displayed image by the user of the client-side device will initiate an event such that a new image is requested from the server. This is illustrated in FIG. 2b wherein parameters sent to the server provide the information necessary for the server to update the image including the composite sub-images stitched thereon. In the example, the right-most section of the image was changed to simulate scrolling. In the new image, the date 14-September can clearly be associated with the data row DS 9140.

Advantageously, using server-side processing along with server-side image manipulation dramatically reduces the amount of data presently needed to be displayed on the client's device. This frees client memory and reduces communication bandwidth. Scrolling in split-screen view requires that the client-side device have sufficient memory, storage, and other resource to run the necessary software performing the requested functions.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for document viewing on a client-side device, comprising:
   (a) receiving, at a server, first user generated data communicated from the client-side device, the first user generated data including document data corresponding to a document to be viewed on the client-side device and client-side display device data corresponding to a client-side display device display capabilities;
   (b) generating, at the server, a first image portion and a second image portion of the document to be viewed on the client-side device, the first image portion being a portion of the document corresponding to client-side display device data, the second image portion being a portion of the document corresponding to client-side display device data, the first image portion being intra-document to be viewed spatially related to the second image portion;
   (c) generating, at the server, a split-bar image to indicate a visual separation between image portions;
   (d) stitching, at the server, the first image portion, the second image portion, and the split-bar image to create a composite image;
   (e) transmitting the composite image to the client-side device to be displayed by the client-side display device;
   (f) receiving, at the server, second user generated data communicated from the client-side device, the second user generated data including data relating to a new viewpoint of the document being viewed on the client-side display device;
   (g) generating, at the server, a third image portion, the third image portion being a portion of the document corresponding to the new viewpoint of the document being viewed on the client-side display device;
   (h) stitching, at the server, the first image portion, the third image portion, and the split-bar image to create a new composite image; and
   (i) transmitting the new composite image to the client-side device to be displayed by the client-side display device.

2. The method as claimed in claim 1, wherein the first image portion has a horizontal relationship with the second image portion.

3. The method as claimed in claim 1, wherein the first image portion has a vertical relationship with the second image portion.

4. A method for document viewing on a client-side device, comprising:
   (a) receiving, at a server, first user generated data communicated from the client-side device, the first user generated data including document data corresponding to a document to be viewed on the client-side device and client-side display device data corresponding to a client-side display device display capabilities;
   (b) generating, at the server, a first image portion and a second image portion of the document to be viewed on the client-side device, the first image portion being a portion of the document corresponding to client-side display device data, the second image portion being a portion of the document corresponding to client-side display device data, the first image portion being intra-document to be viewed spatially related to the second image portion;
   (c) generating, at the server, a split-bar image to indicate a visual separation between image portions;
   (d) generating, at the server, an scroll image to provide an activatable area, within an image portion, to enable a user generated scroll instruction;
   (e) stitching, at the server, the first image portion, the second image portion, the scroll image, and the split-bar image to create a composite view;
   (f) transmitting the composite view to the client-side device to be displayed by the client-side display device;
   (g) receiving, at a server, second user generated data communicated from the client-side device, the second user generated data being generated in response to a user activating the activatable area within the composite view being displayed by the client-side display device so as to request a new viewpoint of the document being viewed on the client-side display device;
   (h) generating, at the server, a third image portion, the third image portion being a portion of the document corresponding to the new viewpoint of the document being viewed on the client-side display device;
   (i) stitching, at the server, the first image portion, the third image portion, the scroll image, and the split-bar image to create a new composite view; and
   (j) transmitting the new composite view to the client-side device to be displayed by the client-side display device.

5. The method as claimed in claim 4, wherein the first image portion has a horizontal relationship with the second image portion.

6. The method as claimed in claim 4, wherein the first image portion has a vertical relationship with the second image portion.

7. The method as claimed in claim 4, wherein the activatable area enables a user to generate a horizontal scroll instruction.

8. The method as claimed in claim 4, wherein the activatable area enables a user to generate a vertical scroll instruction.

9. The method as claimed in claim 4, wherein the activatable area enables a user to generate a vertical/horizontal scroll instruction.

10. A method for document viewing on a client-side device, comprising:
   (a) receiving, at a server, first user generated data communicated from the client-side device, the first user generated data including document data corresponding to a document to be viewed on the client-side device and client-side display device data corresponding to a client-side display device display capabilities;
   (b) generating, at the server, a first image portion and a second image portion of the document to be viewed on the client-side device, the first image portion being a portion of the document corresponding to client-side display device data, the second image portion being a portion of the document corresponding to client-side display device data, the first image portion being intra-document to be viewed spatially related to the second image portion;
   (c) generating, at the server, a split-bar image to indicate a visual separation between image portions, the split-bar image providing an activatable area, within the split-bar image, to enable a user generated scroll instruction;
   (d) stitching, at the server, the first image portion, the second image portion, the scroll image, and the split-bar image to create a composite view;
   (e) transmitting the composite view to the client-side device to be displayed by the client-side display device;
   (f) receiving, at a server, second user generated data communicated from the client-side device, the second user generated data being generated in response to a user activating the activatable area within the composite image being displayed by the client-side display device so as to request a new viewpoint of the document being viewed on the client-side display device;
   (g) generating, at the server, a third image portion, the third image portion being a portion of the document corresponding to the new viewpoint of the document being viewed on the client-side display device;
   (h) stitching, at the server, the first image portion, the third image portion, the scroll image, and the split-bar image to create a new composite view; and
   (i) transmitting the new composite view image to the client-side device to be displayed by the client-side display device.

11. The method as claimed in claim 10, wherein the first image portion has a horizontal relationship with the second image portion.

12. The method as claimed in claim 10, wherein the first image portion has a wed vertical relationship with the second image portion.

13. The method as claimed in claim 12, wherein the activatable area enables a user to generate a horizontal scroll instruction.

14. The method as claimed in claim 12, wherein the activatable area enables a user to generate a vertical scroll instruction.

15. The method as claimed in claim 12, wherein the activatable area enables a user to generate a vertical/horizontal scroll instruction.

* * * * *